Aug. 12, 1930.  A. A. LE ROY  1,772,869
BACK MOTION STOP
Filed Sept. 13, 1928
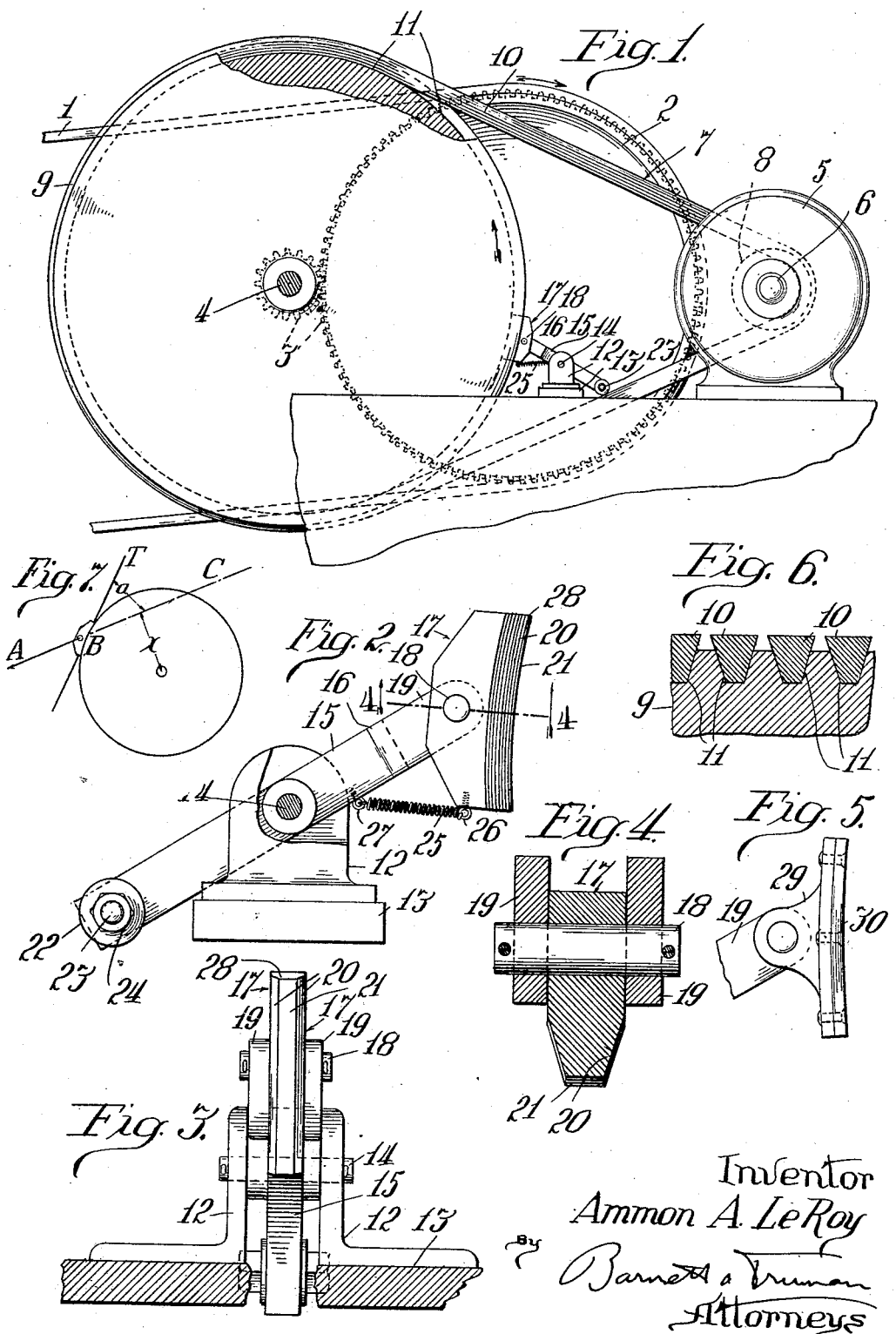
Inventor
Ammon A. LeRoy
By Barnett & Truman
Attorneys Patented Aug. 12, 1930

1,772,869

UNITED STATES PATENT OFFICE

AMMON A. LE ROY, OF SPRINGVILLE, UTAH

BACK-MOTION STOP

Application filed September 13, 1928. Serial No. 305,721.

This invention relates to a back motion stop, and more particularly to a device for preventing retrograde motion or reverse rotation of a loaded member, when the actuating power is cut off.

In the case of an endless conveyor, or an elevator, adapted to lift material from one elevation to another, if the power is cut off at any time the load carried by the upwardly traveling run of the conveyor or elevator will tend to move that run downwardly, thus reversing the motion of the apparatus. It is desirable that means be provided for automatically preventing this reverse motion, and according to the present invention a friction shoe is automatically applied to one of the driving pulleys so as to prevent reverse rotation of this pulley without interfering with its rotation in the proper direction for lifting the load. The friction shoe is so mounted on one arm of a lever that it will bear lightly against the pulley with no appreciable friction when the pulley rotates in the load-lifting direction, but will tend to wedge itself between the pulley and the fulcrum of the lever when the pulley attempts to rotate in a reverse direction.

The principal object of this invention is to provide a back motion stop, such as briefly described hereinabove and disclosed more in detail in the specification which follows.

Another object is to provide a friction brake shoe so mounted and counter-balanced that it will automatically bind against a driving pulley in one direction of rotation of the pulley only.

Another object is to provide a device of this type that is easily reversible, that is may be applied to the pulley so as to prevent rotation in either desired direction.

Another object is to provide in combination with a pivoted friction shoe of this type, a releasing spring so mounted as to prevent dragging of the shoe on the pulley when the pulley is rotating in the desired direction.

Other objects and advantages of this invention will be more apparent from the following detailed description of certain approved forms of the device.

In the accompanying drawings:

Fig. 1 is an elevation partly diagrammatic, showing the back motion stop in use in combination with an endless conveyor.

Fig. 2 is a side elevation, partly broken away, of the back stop.

Fig. 3 is an end elevation of the device as shown in Fig. 2.

Fig. 4 is a detail section, taken substantially on the line 4—4 of Fig. 2, but on a larger scale.

Fig. 5 is a side elevation of a modified form of brake shoe.

Fig. 6 is a fragmental section of a portion of the pulley and driving belts.

Fig. 7 is a diagram illustrating the operating forces.

In Fig. 1 I have indicated a portion of an endless conveyor 1, adapted to continuously lift material from one elevation to another. This conveyor can be of the endless belt type, or in the form of an endless chain of buckets, or any other type of conveyor or elevator. The upper loop of the conveyor is carried by a pulley 2, which is driven through suitable reduction gearing from the shaft 4. The motor 5 and drive shaft 6 actuate the shaft 4 through suitable reduction gearing indicated generally at 7. The preferred form of reduction gearing, as in the example shown, is of the "texrope" type, comprising a pair of suitably grooved pulleys 8 and 9, adapted to receive a plurality of separate similar rubber belts 10 which are wedge-shaped in cross section, the converging portion of the wedge being received in one of the similarly shaped annular grooves 11 in the respective pulleys. The friction stop device forming the particular subject matter of this invention is adapted to engage in one of the grooves 11 of the larger pulley 9, at that side of the pulley not occupied by the belt 10.

A pair of brackets 12 are mounted in opposed relation on any suitable member 13 of the stationary frame work of the conveyor, these brackets supporting a short shaft 14. The lever 15 is intermediately pivoted on shaft 14 so as to swing in a vertical plane between the upwardly extending parallel arms of the brackets 12. One end of lever 15 is forked at 16, and the friction shoe 17 is pivotally mounted on the shaft 18 carried by the spaced arms 19 of the forked portion of the lever. The friction face 20 of shoe 17 is shaped to fit the inner surfaces of one of the grooves 11 of the pulley. The outer surface 21 is curved to conform substantially to the arc of pulley 9, and the frictional surface 20 is wedge shaped in cross section, substantially the same as one of the belts 10. This friction shoe may be made of any suitable friction material, such as white horn fibre.

The other arm of lever 15 carries an adjustable counter-weight 22, which may be conveniently built up of a plurality of metal washers secured on a bolt 23 by a nut 24. This counter-weight will be so adjusted as to nearly counterbalance the friction shoe 17, so that the shoe 17 will rest lightly against the surface of pulley 9.

A light contraction spring 25 is secured at one end 26 to the heel of shoe 17, and is attached at its other end 27 to the lever 15. This spring tends to normally hold the toe 28 of shoe 17 against the pulley and prevents the heel of the friction shoe from dragging on the pulley and perhaps becoming wedged thereagainst, when the pulley rotates in the direction of the arrow.

The stop device will be so mounted adjacent the pulley 9 that the distance from fulcrum 14 of lever 15 to the nearest surface of pulley 9 will be less than the distance from fulcrum 14 to the friction face of shoe 17, consequently the lever 15 cannot assume a position radial of pulley 9, but must incline upwardly as shown. The conveyor 1, pulley 9, and other portions of the driving mechanism will normally travel in the directions of the arrows, as shown in Fig. 1. With pulley 9 rotating in this counterclockwise direction, the toe 28 of friction shoe 17 will bear lightly against the surface of the pulley, but the pulley will have a continual tendency to throw the shoe away from the pulley so that the frictional retardation will be very slight. The counter-weight 22 counter-balances the greater portion of the weight of shoe 17, and the spring 25 prevents the heel of shoe 17 from engaging the pulley and possibly becoming wedged against projecting surfaces thereon. If, however, the motor is halted, or the power is cut off in any other manner, the load carried by the upper run of conveyor 1 will tend to rotate the pulley 9 in a reverse or clockwise direction. The immediate tendency will be to wedge the friction shoe 17 downwardly between the surface of pulley 9 and the fulcrum 14 of lever 15. The greater the pull in this direction, the tighter will the shoe become wedged against the pulley, so that continued rotation of the pulley 9 in this direction is impossible without breaking some portion of the stop device or the driving pulley mechanism. The device is entirely automatic, is immediately effective, and requires no attention when once properly adjusted.

Assuming that the stop device and the driving pulley 9 are mounted in the same relative positions, as shown in Fig. 1, but it is desired that the operative direction of rotation be reversed, that is, pulley 9 be permitted to rotate in a clockwise direction, but not in a counter-clockwise direction, the lever 15 and friction shoe 17 are removed bodily from the supporting brackets 12 and inverted so that the shoe carrying arm of the lever inclines downwardly. The weight of counter-weight 22 will then be slightly increased so that it will slightly overbalance the shoe 17 and thus hold the shoe lightly against the surface of pulley 9. Otherwise, the operation of the device is the same as when mounted as first shown and described.

The diagram shown in Fig. 7 will illustrate the proper positioning of the parts to secure the most effective operation. The centerline of the lever 15, fulcrumed at A, will meet the pulley at B, and if extended as shown at C will intersect the pulley at one side of its center O and in the direction corresponding to the direction of normal rotation of the pulley. When the pulley attempts to rotate in a reverse direction, the force tending to stop this rotation will be exerted along the line AC and will be proportional to the radius or leverarm $x$, or distance from the center O to the line AC. The greater this distance or leverarm $x$, the greater the braking force and the more effective the apparatus. On the other hand, the angle $a$, or angle CBT, between the line AC and the tangent to the circumference of the pulley at the point of frictional engagement B, must be greater than the angle of friction, that is the angle at which the shoe would merely slide on the pulley. While the above discussion indicates the theoretical position of maximum efficiency, there are other factors such as the arcuate length of the friction shoe and the added force applied by the tilting spring 25, which vary to some degree the proportioning of the parts. In general, the device should engage the pulley at as great an angle as possible without exceeding the angle of friction between the shoe and pulley.

While this back stop device is shown as applied to a grooved "texrope" pulley, it is equally applicable to any other type of pulley or driving wheel, by simply changing the contour of the friction surface of the shoe to conform to the opposed surface on the wheel or pulley. When a flat face wheel is to be stopped or braked, the friction shoe (as shown in Fig. 5) will be provided with an arcuate surface conforming to that of the wheel and fitted with a covering of asbestos brake lining 30, or other suitable friction material.

While the stop device is here shown and described as applied to a rotatable pulley or other rotating member, it will be apparent that it could be applied to the rectilinear surface of any longitudinally moving member, to permit movement thereof in one direction only. By suitably changing the contour of the friction surface of the brake or friction shoe, retrograde motion of practically any moving member could be prevented.

It will be apparent that numerous changes in the details of construction and proportion of parts are possible without departing from the spirit of this invention as covered by the claims which follow.

I claim:

1. A back motion stop comprising a supporting bracket, a lever intermediately pivoted in the bracket, a friction shoe pivoted at one end of the lever, a spring connecting one end of the shoe with the lever and tending to tilt the shoe in one direction, and counter-balancing means connected with the other end of the lever.

2. A back motion stop comprising a supporting bracket, a lever intermediately pivoted in the bracket, a friction shoe pivoted at one end of the lever, a spring connecting one end of the shoe with the lever and tending to tilt the shoe in one direction, and an adjustable counter-weight for the shoe mounted on the other end of the lever.

3. In combination with a rotatable driving pulley, a back rotation stop therefor comprising a supporting bracket, a lever intermediately pivoted in the bracket, a friction shoe having a face shaped to engage the pulley, the shoe being pivoted at the free end of one arm of the lever, the distance from the fulcrum of the lever to the nearest face of the pulley being less than the distance from the fulcrum of the lever to the face of the friction shoe, a spring connecting the lever with that end of the shoe nearest the fulcrum of the lever, and counter-balancing means connected with the other arm of the lever.

4. In combination with a rotatable driving pulley, having a grooved circumference for receiving a wedge shaped belt, a back rotation stop comprising a supporting bracket, a lever intermediately pivoted in the bracket, a friction shoe having a face shaped to engage within the groove of the pulley, the shoe being pivoted in the free end of one arm of the lever, the distance from the fulcrum of the lever to the face of the shoe being greater than the distance from the fulcrum of the lever to the face of the pulley, a spring connecting the lever with the end of the shoe nearest the fulcrum of the lever, and a counter-balance carried by the other arm of the lever.

AMMON A. LE ROY.